United States Patent
Soto et al.

(10) Patent No.: US 8,404,106 B2
(45) Date of Patent: Mar. 26, 2013

(54) REGENERATION OF ALKALI METAL REAGENT

(75) Inventors: Jorge L. Soto, Centreville, VA (US); Daniel P. Leta, Flemington, NJ (US); Lu Han, Herndon, VA (US); Walter D. Vann, Glen Mills, PA (US); Mark A. Greaney, Upper Black Eddy, PA (US); James R. Bielenberg, Easton, PA (US); Paul D. Oldenburg, Easton, PA (US); Jonathan M. McConnachie, Annandale, NJ (US); Leo D. Brown, Baton Rouge, LA (US); William C. Baird, Jr., Baton Rouge, LA (US); Roby Bearden, Jr., Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 286 days.

(21) Appl. No.: 12/967,703

(22) Filed: Dec. 14, 2010

(65) Prior Publication Data
US 2011/0147274 A1    Jun. 23, 2011

Related U.S. Application Data

(60) Provisional application No. 61/284,517, filed on Dec. 18, 2009.

(51) Int. Cl.
*C10G 19/02* (2006.01)
*C10G 19/00* (2006.01)
*C10G 19/08* (2006.01)

(52) U.S. Cl. .......... 208/226; 208/208 R; 208/209; 208/230; 208/234; 208/235

(58) Field of Classification Search ............ 208/208 R, 208/226
See application file for complete search history.

(56) References Cited

U.S. PATENT DOCUMENTS

| | | |
|---|---|---|
| 3,051,645 A | 8/1962 | Wilson et al. |
| 3,104,157 A | 9/1963 | Kimberlin, Jr. et al. |
| 3,128,155 A | 4/1964 | Mattox |
| 3,136,714 A | 6/1964 | Gibson et al. |
| 3,164,545 A | 1/1965 | Mattox |
| 3,354,081 A | 11/1967 | Aldridge |
| 3,383,304 A | 5/1968 | Mattox et al. |
| 3,438,727 A | 4/1969 | Heredy |
| 3,442,797 A | 5/1969 | Aldridge |
| 3,449,242 A | 6/1969 | Mattox et al. |
| 3,835,033 A | 9/1974 | Dugan et al. |
| 3,847,797 A | 11/1974 | Pasternak et al. |
| 3,850,742 A | 11/1974 | Dugan et al. |
| 3,852,188 A | 12/1974 | Dugan et al. |
| 3,873,670 A | 3/1975 | Dugan et al. |
| 3,876,527 A | 4/1975 | Dugan et al. |
| 4,003,823 A | 1/1977 | Baird, Jr. et al. |
| 4,003,824 A | 1/1977 | Baird, Jr. et al. |

(Continued)

FOREIGN PATENT DOCUMENTS

| | | |
|---|---|---|
| JP | 55097228 | 7/1980 |
| WO | 2010039272 | 4/2010 |

*Primary Examiner* — Walter D Griffin
*Assistant Examiner* — Derek Mueller
(74) *Attorney, Agent, or Firm* — Bruce M. Bordelon (57) ABSTRACT

After desulfurizing a hydrocarbon feedstream using an alkali metal reagent, the hydrocarbon feedstream can include particles of spent alkali metal salts. The spent alkali metal salts can be separated from the hydrocarbon feedstream and regenerated to form an alkali metal reagent, such as a alkali hydroxide or alkali sulfide. The regeneration process can pass through an intermediate stage of forming an alkali carbonate by successive reactions with carbon dioxide and calcium oxide. The calcium oxide can also be regenerated.

20 Claims, 3 Drawing Sheets

U.S. PATENT DOCUMENTS

| | | | |
|---|---|---|---|
| 4,007,109 A | 2/1977 | Baird, Jr. et al. | |
| 4,007,111 A | 2/1977 | Baird, Jr. | |
| 4,081,522 A | 3/1978 | Hubble et al. | |
| 4,087,348 A | 5/1978 | Baird, Jr. et al. | |
| 4,119,528 A | 10/1978 | Baird, Jr. et al. | |
| 4,127,470 A | 11/1978 | Baird, Jr. et al. | |
| 4,147,611 A | 4/1979 | Miasek et al. | |
| 4,147,612 A | 4/1979 | Miasek et al. | |
| 4,243,645 A * | 1/1981 | Lahoda | 423/232 |
| 4,437,908 A | 3/1984 | Inoue | |
| 4,545,891 A | 10/1985 | Meyers et al. | |
| 4,566,965 A | 1/1986 | Olmstead | |
| 4,686,090 A | 8/1987 | Howell et al. | |
| 4,927,524 A | 5/1990 | Rodriguez et al. | |
| 5,059,307 A | 10/1991 | Meyers et al. | |
| 5,508,018 A | 4/1996 | Brons et al. | |
| 5,626,742 A | 5/1997 | Brons et al. | |
| 5,635,056 A | 6/1997 | Brons et al. | |
| 5,695,632 A | 12/1997 | Brons et al. | |
| 5,871,637 A | 2/1999 | Brons | |
| 5,904,839 A | 5/1999 | Brons | |
| 5,935,421 A | 8/1999 | Brons et al. | |
| 5,985,764 A | 11/1999 | Lin et al. | |
| 2004/0069682 A1 | 4/2004 | Freel et al. | |
| 2004/0069686 A1 | 4/2004 | Freel et al. | |
| 2005/0230659 A1 | 10/2005 | Hampden-Smith et al. | |
| 2006/0151359 A1 | 7/2006 | Ellis et al. | |
| 2009/0065396 A1 | 3/2009 | Kokayeff et al. | |
| 2009/0152168 A1 | 6/2009 | Siskin et al. | |
| 2010/0039272 A1 | 2/2010 | Kowalchuk | |

* cited by examiner

REGENERATION OF ALKALI METAL REAGENT

This application claims the benefit of U.S. Provisional Application No. 61/284,517 filed Dec. 18, 2009.

FIELD OF THE INVENTION

The present invention relates to a process for regeneration of alkali metal salt reagent used in desulfurization of heavy oil feedstreams.

DESCRIPTION OF RELATED ART

Heavy oils and bitumens make up an increasing percentage of available liquid hydrocarbon resources. As the demand for hydrocarbon-based fuels has increased, a corresponding need has developed for improved processes for desulfurizing heavy oil feedstreams. Processes for the conversion of the heavy portions of these feedstreams into more valuable, lighter fuel products have also taken on greater importance. These heavy oil feedstreams include, but are not limited to, whole and reduced petroleum crudes, shale oils, coal liquids, atmospheric and vacuum residua, asphaltenes, deasphalted oils, cycle oils, FCC tower bottoms, gas oils, including atmospheric and vacuum gas oils and coker gas oils, light to heavy distillates including raw virgin distillates, hydrocrackates, hydrotreated oils, dewaxed oils, slack waxes, raffinates, and mixtures thereof.

Hydrocarbon streams boiling above 430° F. (220° C.) often contain a considerable amount of large multi-ring hydrocarbon molecules and/or a conglomerated association of large molecules containing a large portion of the sulfur, nitrogen and metals present in the hydrocarbon stream. A significant portion of the sulfur contained in these heavy oils is in the form of heteroatoms in polycyclic aromatic molecules, comprised of sulfur compounds such as dibenzothiophenes, from which the sulfur is difficult to remove.

Processing of bitumens, crude oils, or other heavy oils with large numbers of multi-ring aromatics and/or asphaltenes can pose a variety of challenges. Conventional hydroprocessing methods can be effective at improving API for a heavy oil feed, but the hydrogen consumption can be substantial. Conversion of the liquid to less valuable products, such as coke, can be another concern with conventional techniques.

SUMMARY OF THE INVENTION

The present invention relates to a process for regeneration of alkali metal salt reagent used in desulfurization of heavy oil feedstreams.

In an embodiment, is a method for regenerating an alkali metal salt reagent, comprising:

a) receiving a hydrocarbon feedstream having an API gravity of at least about 20, the hydrocarbon feedstream including at least about 7.5 wt % of alkali metal salt particles, the alkali metal salt particles comprising alkali metal hydrogen sulfide particles;

b) washing the hydrocarbon feedstream with water to form a hydrocarbon product stream and an aqueous alkali metal salt stream containing alkali metal salt;

c) treating at least a portion of the aqueous alkali metal salt stream with carbon dioxide under effective conditions to form an aqueous alkali carbonate stream;

d) mixing the aqueous alkali carbonate stream with regenerated calcium oxide under effective conditions to form an aqueous alkali metal hydroxide and calcium carbonate solids;

e) separating the calcium carbonate from the aqueous alkali metal hydroxide; and f) heating the calcium carbonate under effective conditions to form regenerated calcium oxide, wherein at least a portion of the regenerated calcium oxide is used for said mixing with aqueous alkali carbonate.

In a preferred embodiment, the aqueous alkali carbonate stream includes aqueous bicarbonate, the method further comprising heating the aqueous alkali carbonate stream to convert aqueous bicarbonates to aqueous carbonates prior to the mixing with the regenerated calcium oxide.

In an even more preferred embodiment, the alkali metal hydroxide is comprised of potassium hydroxide, sodium hydroxide, or a combination thereof.

In another preferred embodiment is a method for regenerating an alkali metal salt reagent, comprising:

a) receiving a hydrocarbon feedstream having an API gravity of at least about 20, the hydrocarbon feedstream including at least about 7.5 wt % of alkali metal salt particles, the alkali metal salt particles comprising alkali hydrogen sulfide particles;

b) washing the hydrocarbon feedstream with water to form a hydrocarbon product stream and an aqueous stream containing alkali metal salt;

c) splitting the aqueous stream comprising alkali metal salt into a first portion and a second portion;

d) treating the first portion of the aqueous alkali metal salt stream with carbon dioxide under effective conditions to form aqueous alkali carbonate;

e) mixing the aqueous alkali carbonate with calcium oxide under effective conditions to form alkali hydroxide and calcium carbonate solids;

f) separating the calcium carbonate from the aqueous alkali hydroxide;

g) combining the second portion of aqueous alkali metal salt with the aqueous alkali hydroxide;

h) dehydrating the combined aqueous alkali metal salt and aqueous alkali metal hydroxide to form alkali metal sulfide; and i) heating the calcium carbonate under effective conditions to form regenerated calcium oxide, wherein at least a portion of the regenerated calcium oxide is used for said mixing with aqueous alkali carbonate.

DETAILED DESCRIPTION OF THE INVENTION

Overview

In various embodiments, methods are provided for regeneration of alkali metal salts used as a reagent in desulfurization of heavy oil feeds. Using an alkali metal salt as a reagent can provide a number of advantages over conventional processes. Relative to thermal conversion processes, an alkali metal salt desulfurization provides for improved liquid product yields and corresponding reduction in production of coke. Relative to conventional hydroprocessing, alkali metal salt processes have a reduced hydrogen consumption. Alkali metal salt desulfurization processes can also operate at lower temperatures and/or pressures, allowing for reduced capital and/or operating costs.

Regeneration of alkali metal salt reagents can allow some or all of the above benefits to be achieved in a cost effective manner. Spent alkali metal reagent, typically in the form of a alkali hydrogen sulfide, can be regenerated to alkali hydroxide and/or alkali sulfide via an intermediate conversion to alkali carbonate. The alkali carbonate can then be reacted with calcium oxide to form alkali hydroxide and calcium carbonate. Further cost savings can be achieved by regenerating the calcium oxide. Optionally, the carbon dioxide can also be recycled, by capturing carbon dioxide from the regeneration of calcium oxide and using this carbon dioxide for formation of alkali carbonate.

Alkali Metal Salt Desulfurization

Various embodiments of the invention can be useful for desulfurization of "heavy oil feedstreams" or "heavy oil streams", which as used herein are equivalent. Heavy oil feedstreams or heavy oil streams are defined as any hydrocarbon-containing streams having an API gravity equal to or less than 19. Preferred heavy oil feedstreams for use in the present invention include, but are not limited to, low API gravity, high sulfur, high viscosity crudes; tar sands bitumen; liquid hydrocarbon streams derived from tar sands bitumen, coal, or oil shale; as well as petrochemical refinery heavy intermediate fractions, such as atmospheric resids, vacuum resids, and other similar intermediate feedstreams and mixtures thereof containing boiling point materials above about 650° F. (343° C.). Heavy oil feedstreams as described herein may also include a blend of the hydrocarbons listed above with lighter hydrocarbon streams, such as, but not limited to, distillates, kerosene, or light naphtha diluents, and/or synthetic crudes, for control of certain properties desired for the transport or sale of the resulting hydrocarbon blend, such as, but not limited to, transport or sale as fuel oils and crude blends. In preferred embodiments of the present invention, the heavy oil feedstream contains at least 60 wt % hydrocarbon compounds, and more preferably, the heavy oil feedstream contains at least 75 wt % hydrocarbon compounds.

The sulfur content of the heavy oil feedstream can contain at least about 0.5 wt % sulfur, preferably at least about 1 wt % sulfur, and more preferably at least about 3 wt % sulfur. In other embodiments, the heavy oil feedstream can contain polycyclic sulfur heteroatom complexes which are difficult to desulfurize by conventional methods.

In various embodiments, an alkali metal salt can be used as a reagent in a desulfurization process. In order to use the alkali metal salt as a reagent, the alkali metal salt can be mixed into the heavy oil feedstream as an aqueous solution. The mixture of heavy oil and aqueous alkali metal salt solution can then be partially, substantially, or completely dehydrated to produce a heavy oil feedstream containing alkali metal salt particles.

Preferably, the alkali metal can be potassium. In alternative embodiments, other alkali metals can be used, such as sodium, lithium, cesium, or rubidium. The alkali metal can be in the form of a salt, such as a sulfide or a hydroxide. Preferably, the alkali metal salt reagent can be KOH, $K_2S$, or a combination thereof. More preferably, the alkali metal salt reagent is KOH. Note that in embodiments involving a sulfide, species such as KHS that also include a hydrogen may be present, although these are believed to be not preferred due to a lower activity for sulfur removal. Mixtures of alkali metals in a reagent are also possible, such as NaKS.

In an embodiment, the alkali metal salt can be introduced into the heavy oil feed as an aqueous stream. Preferably, the aqueous stream of alkali metal salt can be a roughly saturated solution of alkali metal salt in water. The solubility of alkali metal salts in water is dependent on the type of salt. For example, KOH is soluble up to about 50 wt % KOH in an aqueous solution.

The aqueous alkali metal salt solution can be combined with the full heavy oil feed. Alternatively, the alkali metal salt solution can be mixed with a side stream of the feed. Mixing of the heavy oil and the aqueous stream can be facilitated using a static or dynamic mixer.

After mixing of the aqueous alkali metal salt solution and the heavy oil, the water can be removed from the mixture. Removing the water from the mixture of heavy oil and alkali metal salt reagent will convert the alkali metal salt reagent from a state of droplets of salt solution suspended in the heavy oil to solid particles of the reagent in the oil. Preferably, the water can be removed from the mixture by heating the mixture. One method for removing the water is to heat the mixture in a flash drum to a temperature of at least about 250° C. (482° F.), or at least about 275° C. (527° F.). The temperature for removing the water can be about 310° C. (590° F.) or less, or about 300° C. (572° F.) or less. The temperature can be selected so that the temperature is high enough to substantially remove the water while being low enough so that little or no reaction occurs between alkali metal salt reagent and the sulfur in the heavy oil.

After removing water, the mixture of alkali metal reagent stream and heavy oil can be introduced into a suitable reactor. Herein, the desulfurization reactor can be comprised of a vessel or even simply piping which provides sufficient contact time and conditions for a desired level of desulfurization of the hydrocarbon portion of the overall process stream. A hydrogen-containing stream may optionally be added to an alkali metal desulfurization reaction. If a hydrogen-containing stream is utilized, it is preferred that the hydrogen-containing stream contain at least 50 mol % hydrogen, more preferably at least 75 mol % hydrogen. When hydrogen is utilized in the process, it is preferred that the hydrogen partial pressure in the heavy oils desulfurization reactor be from about 100 to about 2500 psi (689 to 17,237 kPa). At these partial pressures, the hydrogen assists in the reaction process by removing at least a portion of the sulfur in the hydrocarbons via conversion to the alkali metal hydrosulfide, which may, but is not required to, go through a hydrogen sulfide, $H_2S$ intermediate. Hydrogen sulfide that is formed in the first reaction zone can also react with the alkali metal hydroxides donating some of the sulfur and forming alkali metal hydrosulfides and alkali metal sulfides thereby improving the overall sulfur removal in the process. Excess hydrogen also assists in hydrogenating the broken sulfur bonds in the hydrocarbons and increasing the hydrogen saturation of the resulting desulfurized hydrocarbon compounds.

Preferably, two or more reactors can be used as desulfurization reactors. A separator can be included after each reactor to remove contaminants, such as $H_2S$ or water vapor that forms during the reaction. Another potential advantage of using two or more reactors is that the conditions in the reactors can be controlled separately. For example, the first of two reactors can be set at more severe conditions. Based on the design of the reactor, the holding time in the first reactor can correspond to a first period of time less than the desired reaction time. The partially reacted feed can then be passed to a second reactor zone at a less severe reaction condition, such as reactor at a lower temperature. By limiting the amount of time the heavy oil spends under more severe conditions, a desired level of desulfurization and/or conversion can be achieved, while reducing the amount of undesired coke production.

Suitable desulfurization conditions in a heavy oils desulfurization reactor can include temperatures from about 600° F. to about 900° F. (316° C. to 482° C.), preferably about 650° F. to about 875° F. (343° C. to 468° C.), and more preferably about 700° F. to about 850° F. (371° C. to 454° C.). Suitable reaction pressures can be from about 50 to about 3000 psi (345 to 20,684 kPa), preferably about 200 to about 2200 psi (1,379 to 15,168 kPa), and more preferably about 500 to about 1500 psi (3,447 to 10,342 kPa). In a preferred embodiment, the contact time of the heavy oils feedstream and the alkali metal hydroxide stream in the heavy oils desulfurization reactor can be about 5 to about 720 minutes, preferably about 30 to about 480 minutes, and more preferably 60 to about 240 minutes. It is noted that a suitable contact time can be dependent upon the physical and chemical characteristics of the hydrocarbon stream including the sulfur content and sulfur species of the hydrocarbon stream, the amount of sulfur to be removed, and the molar ratio of the alkali metal reagent used in the process to the sulfur present in the heavy oils feedstream.

In an embodiment, the desulfurized product can have an API of at least about 20, or at least about 21, or at least about 23. The viscosity can be about 40 cst or less at 40° C. Alternatively, the viscosity can be about 350 cst or less at a temperature of about 7.5-18.5° C.

The amount of alkali metal salt reagent mixed with the heavy oil feed can be selected based on the sulfur content of the feed. In an embodiment, the amount of alkali metal salt, on a moles of alkali metal versus moles of sulfur basis, can be at least about 1.2 times the amount of sulfur in the feed, or at least about 1.4 times, or at least about 1.5 times. Alternatively, the amount of alkali metal salt can be about 2.5 times the amount of sulfur or less, or about 2 times or less, or about 1.75 times or less. In another embodiment, the weight of the alkali metal salt particles in the hydrocarbon heavy oil feed can be at least about 2 wt %, or at least about 3 wt %, or at least about 7.5 wt %, or at least about 10 wt %, or at least about 15 wt %. Alternatively, the weight of alkali metal salt particles can be about 20 wt % or less, or about 15 wt % or less, or about 10 wt % or less.

Separation of Spent Alkali Metal Reagent

After forming a desulfurized heavy oil product, the spent alkali metal can be separated from the desulfurized oil. For example, if KOH is used as an alkali metal salt reagent, the KHS, $K_2S$, and any excess KOH can be separated from the desulfurized heavy oil product. If $K_2S$ is present in the desulfurized oil, the $K_2S$ can convert into KOH and KHS when exposed to water from a water wash. Preferably, the separation process can remove ~99.9% of the potassium from the desulfurized product. In such an embodiment where a desulfurization reaction is performed with a reagent treat rate of 15 wt %, this would result in a desulfurized product containing about 150 ppm potassium or less.

In addition to alkali metal reagent that becomes spent directly due to desulfurization, a portion of the alkali metal reagent can be consumed through formation of other species, such as $K_2CO_3$. The amount of alkali carbonate formed during desulfurization can vary, and can account for up to a third of the alkali metal consumed during a desulfurization process.

In an embodiment, removal of the spent alkali metal from the desulfurized heavy oil can be performed using a multi-stage process. Preferably, the spent alkali metal can be separated using a water wash. For such a separation, the reactor product and K-salts mixture can be mixed with the wash water through mixing valves. As an example, two settler stages and one desalting stage can be used in series to achieve separation of the spent alkali metal and the desulfurized oil. The settling stages can be vessels where wash water and desulfurized oil are introduced and mixed to form separate oil and water layers. A desalting stage can be a settling stage that also includes an electrostatic precipitator so that electrostatic coalescence can be used to assist the settling process. Preferably, a desalting stage can be used as a final wash stage.

The wash water can be distributed between the separation stages in any convenient manner. In an embodiment, the flow of water can be globally counter-current, so that fresh wash water is used in the final wash stage. The water product from each wash stage is then successively used in each earlier stage until the first stage is reached. The amount of wash water used for separation can be at least about 5 vol % of the total volume of the desulfurized oil, or at least about 10 vol %, or at least about 15 vol %. Alternatively, the amount of wash water can be about 60 vol % or less, or about 50 vol % or less, or about 40 vol % or less, or about 30 vol % or less.

The oil and water mixture in a settling vessel will separate into an aqueous phase and a desulfurized oil phase. These phases can be present in each stage of a multi-stage separator. The desulfurized oil phase can still include small amounts of spent alkali metal salts, other solids, and some water. Part of the reason for using multiple stages can be to successively reduce the levels of these impurities in each of the phases. The other phase in the settling vessel is an aqueous phase that includes the majority of the spent alkali metal as a solution. Although the spent alkali metal salt can be a particle in the desulfurized oil prior to separation, the spent alkali metal salt is typically soluble in water. The aqueous phase will have a higher density than the desulfurized oil phase and will tend to be drawn off from the bottom of the settling vessel. Other solids in the mixture, such as asphaltenes, coke and metals will tend to settle into the aqueous phase or at the bottom of the settling vessel where these solid materials can be drawn off with the aqueous phase materials and/or be separately collected and removed from the settling vessel. A filter or other suitable means can also be used to capture any solids that exit the separator with the aqueous phase stream.

The concentration of alkali metal salt in the aqueous phase produced by the one or more stages of a water wash separator can be at least about 15 wt %, or at least about 25 wt %. The concentration can be about 40 wt % or less, or about 35 wt % or less. Higher concentrations are preferable, as this can reduce the amount of water removal needed to provide a concentrated alkali metal salt reagent solution.

The reaction conditions for separating the alkali metal salt from the desulfurized oil can be temperatures and pressures that are convenient for the other stages of the regeneration process. The separation conditions can include a temperature of at least about 120° C. (248° F.), or at least about 135° C. (275° F.), or at least about 150° C. (302° F.). The separation pressure can be at least about 100 psig (690 kPa), or at least about 200 psig (1379 kPa), or at least about 300 psig (2068 kPa), or at least about 350 psig (2413 kPa).

Conversion of Spent Alkali Metal to Carbonate

After separation of the spent alkali metal from the desulfurized oil, the spent alkali metal can be converted into a carbonate as an intermediate point in the process of regenerating the alkali metal. In an embodiment involving potassium as the alkali metal, this can involve converting KHS in the aqueous spent alkali metal stream into $K_2CO_3$.

KHS can be converted into $K_2CO_3$ by bubbling $CO_2$ gas through the aqueous spent alkali metal solution. The displaced sulfur can ultimately form $H_2S$, which can be sent to a Claus plant. Optionally, an amine plant can be used to remove excess $CO_2$ from the $H_{2S}$ product. This process can lead to production of both $K_2CO_3$ and $KHCO_3$. Depending on the conditions, the amount of $KHCO_3$ production can be substantial, such as up to about 30% or higher. Any $KHCO_3$ that is formed can be converted after the carbonation reaction to $K_2CO_3$, $CO_2$, and water by heating the aqueous solution, such as by exposing the solution to steam stripping conditions at about 150° C. (302° F.) or more, or at about 175° C. (347° F.) or more. More generally, it is believed that $KHCO_3$ is less stable at temperatures above 110° C. (230° F.), so other methods involving heating the $KHCO_3$ can be suitable for conversion to $K_2CO_3$. In another embodiment, boiling of the aqueous solution containing the $KHCO_3$ may be sufficient for conversion to $K_2CO_3$. Conversion of any $KHCO_3$ to $K_2CO_3$ can be beneficial in that the additional $CO_2$ released by conversion to $K_2CO_3$ may be recycled back to the carbonation step, thereby reducing the overall $CO_2$ use requirement.

The $CO_2$ can be contacted with the spent alkali metal in any convenient manner. For example, one or more counter-current flow stages can be set up for passing $CO_2$ gas through the aqueous solution of spent alkali metal salt. Multiple stages can be used to improve the conversion efficiency, such as using three consecutive counter-current stages.

The reaction conditions for contacting the spent alkali metal with $CO_2$ can include a temperature of at least about 120° C. (248° F.), or at least about 135° C. (275° F.), or at least about 150° C. (302° F.). The reaction pressure can be at least about 200 psig (1379 kPa), or at least about 250 psig (1724 kPa), or at least about 300 psig (2068 kPa), or at least about 350 psig (2413 kPa).

Conversion of Alkali Carbonate to Active Reagent

After forming an alkali carbonate, such as $K_2CO_3$, the alkali carbonate is converted into an alkali hydroxide via reaction with CaO. The alkali carbonate can be contacted with the CaO in any convenient manner. One suitable method is to contact an aqueous alkali carbonate solution with the CaO in a stirred tank reactor. The CaO may be added as a solid or as an aqueous slurry. It may be preferable to generate the aqueous CaO slurry under conditions suitable to convert at least a portion of the aqueous slurry from CaO to $Ca(OH)_2$. The carbonate solution can be held in the reactor for a sufficient amount of time to achieve a desired level of conversion. A suitable holding time can be at least one minute, or at least 5 minutes, or at least 10 minutes. A desired level of conversion in each reactor can be at least 50%, or at least 75%, or at least 90%, or at least 95%. By using multiple reactors that each achieve a desired level of conversion, a higher total level of conversion can be achieved, such as at least 99% conversion, or at least 99.9% conversion. Note that any bicarbonate species present, such as $KHCO_3$, will also be converted to alkali hydroxide. However, this reaction is not preferred, as additional Ca is consumed by this process. Thus, it is preferred to drive the alkali carbonate reaction in the prior stage substantially to completion, such as by supplementing the formation of alkali carbonate by heating the carbonate containing solution, as described above.

During contacting of the alkali carbonate with CaO, the solution can also be seeded with seed particles of $CaCO_3$. The reaction of alkali carbonate with CaO typically produces an alkali hydroxide which is soluble in water. The reaction typically also produces $CaCO_3$, which is insoluble and forms particles. Depending on the reaction conditions, the particle size of the $CaCO_3$ particles can vary. The size of the $CaCO_3$ particles formed under a given reaction condition can be increased by introducing seed particles of $CaCO_3$.

The $CaCO_3$ particles can be removed from the aqueous solution by any convenient method. One option for removing the particles is by filtration. Increasing the size of the $CaCO_3$ particles can assist in allowing the particles to be removed by filtration. Increasing the size of the $CaCO_3$ particles can also assist with density based separation process, such as settling or centrifugal techniques.

Note that the conversion of alkali carbonate to alkali hydroxide does not have to be driven to completion. If some alkali carbonate remains, the alkali carbonate will pass through a subsequent hydrocarbon desulfurization and/or conversion reaction without harming the reaction. Instead, alkali metal which remains in the carbonate form will act as a spectator rather than as a reagent. This can mean that additional alkali metal will be needed to achieve the same level of reaction. After separating the dissolved alkali hydroxide from the calcium solids, the alkali hydroxide solution can be partially dehydrated to further concentrate the alkali hydroxide solution, prior to use again in the desulfurization reaction. For example, the alkali hydroxide solution can be heated to remove water content, leading to a solution with a concentration of alkali hydroxide of at least about 30 wt %, or at least about 40 wt %, or at least about 50 wt %.

The reaction conditions for contacting the alkali metal carbonate with CaO can include a temperature of at least about 135° C. (275° F.), or at least about 150° C. (302° F.), or at least about 160° C. (320° F.). The reaction pressure can be at least about 200 psig (1379 kPa), or at least about 250 psig (1724 kPa), or at least about 300 psig (2068 kPa), or at least about 350 psig (2413 kPa).

Regeneration of CaO

In order to complete the regeneration cycle, the $CaCO_3$ can be regenerated to form CaO for use in further regeneration of the alkali metal reagent. $CaCO_3$ can be converted to CaO+$CO_2$ if exposed to sufficiently high temperatures. One example of a method for regenerating CaO is to pass the $CaCO_3$ particles through a kiln operating at a temperature of at least about 900° C. (1652° F.), or at least about 1000° C. (1832° F.). After regeneration, the CaO can be used again for regenerating alkali metal reagent.

Prior to regeneration, the $CaCO_3$ can be passed through a water wash stage to remove any excess alkali metal. A vacuum filtration can then be used to remove the water and dissolved alkali metal prior to sending the $CaCO_3$ to a kiln or other heating step for CaO formation. Excess alkali metal present in the $CaCO_3$ can lead to additional $CO_2$ remaining in the CaO product. While this is not detrimental to the other processes, it can lead to consumption of alkali metal and calcium as spectator species.

Alternative Regeneration Pathway

As an alternative to regenerating spent alkali metal reagent to an alkali hydroxide, the spent alkali metal can be regenerated to an alkali metal sulfide. This can be accomplished by regenerating only a part of the spent alkali metal to alkali hydroxide. The remaining portion of the spent alkali metal is mixed with the regenerated alkali hydroxide, and then dehydrated to force formation of alkali metal sulfide.

As an example, if the alkali metal is potassium, the spent alkali metal can be in the form of KHS, and possibly some KOH. The stream can then be split, so that the amount of KHS that is not regenerated is equal to the total amount of KOH present before any regeneration plus the KOH formed during regeneration. The two portions can then be recombined, and the solution can be dehydrated substantially to completion. This will drive the following reaction:

$$KHS + KOH \Longleftrightarrow K_2S + H_2O\uparrow$$

In an embodiment, regenerating the spent alkali metal reagent to alkali metal sulfide form rather than hydroxide form can have the advantage of minimizing the reagents used in the regeneration process. This can be due to avoiding the conversion of unreacted alkali hydroxide to carbonate form and then back to hydroxide form. The above dehydration can require a temperature up to about 375° C. (707° F.) to drive the reaction to completion. If temperatures of only about 300° C. (572° F.) are used, the reaction product may not be completely dehydrated and driven to the $K_2S$ species, thus allowing at least some KHS and KOH to remain in the reaction product. Preferably, the dehydration temperature can be at least about 325° C. (617° F.), or at least about 350° C. (662° F.).

EXAMPLES OF REACTION SYSTEM CONFIGURATION

Figure 1:
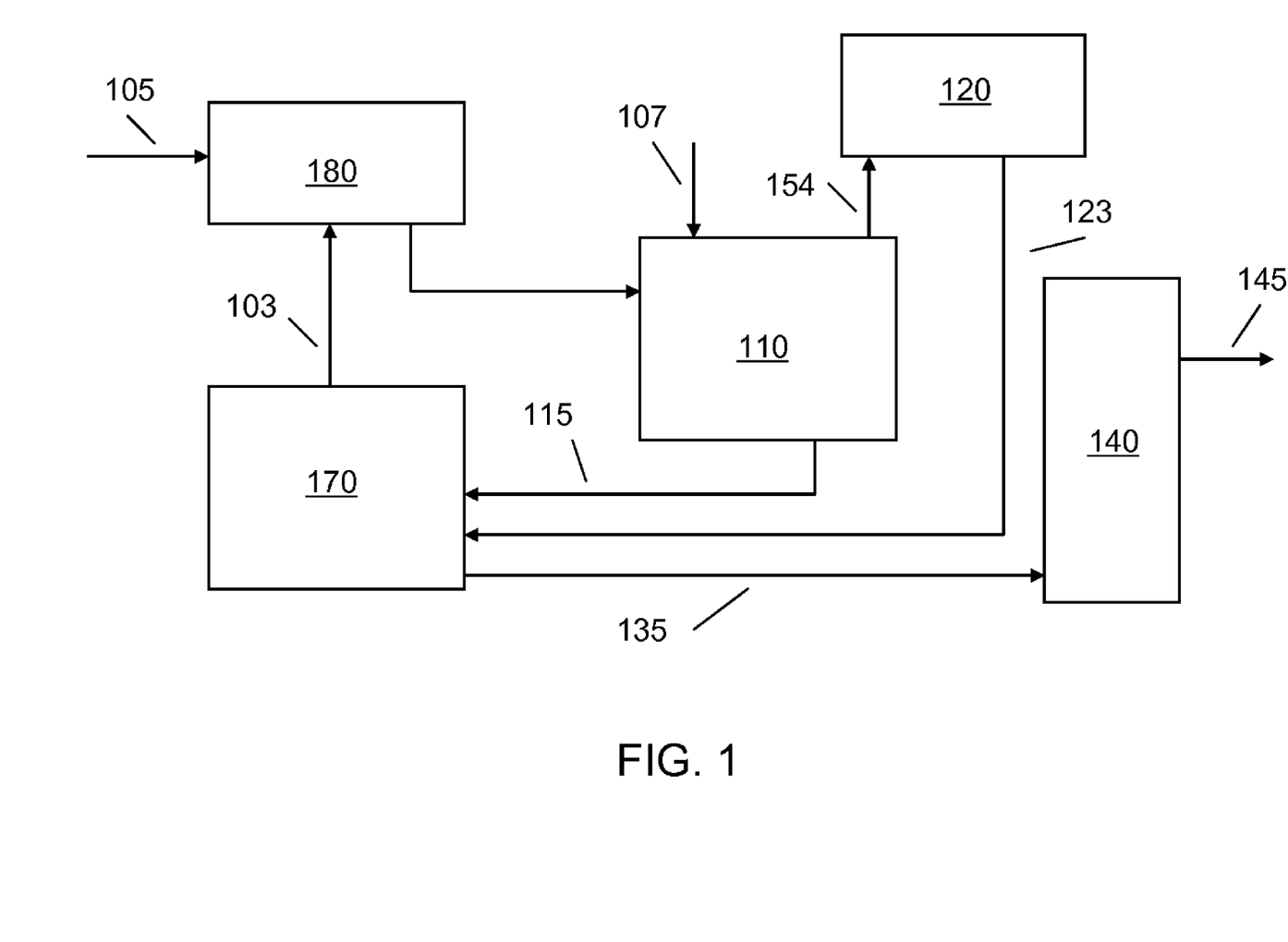
FIG. 1 schematically shows an overview of an apparatus according to an embodiment of the invention.

FIG. 1 schematically shows an example of a reaction system for performing an alkali metal salt desulfurization. FIG. 1 illustrates a preferred embodiment of the present invention wherein an alkali metal hydroxide treatment single reactor system is utilized. It should be noted that FIG. 1 as presented herein is a simplified flow diagram, only illustrating the major processing equipment components and major process streams. It should be clear to one of skill in the art that additional equipment components and auxiliary streams may be utilized in the actual implementation of the invention as described.

In the embodiment shown in FIG. 1, a heavy oils stream 105 is mixed with an alkali metal reagent stream 103 in a pre-mixing zone 180. In pre-mixing zone 180, initial mixing of the heavy oil and alkali metal stream can occur. The mixture can also be heated to remove water from the mixed stream, leading to formation of alkali metal reagent particles within the heavy oil stream. In FIG. 1, alkali metal reagent stream is shown as being provided from alkali metal reagent separator and regenerator 170. Alternatively, some or all of the alkali metal reagent stream 103 can be provided as a fresh stream.

The dehydrated mixture of oil and alkali metal reagent particles from pre-mixing zone 180 can be combined with an optional hydrogen stream 107 in desulfurization reactor stage 110. Alternatively, the streams may be mixed prior to entering the reactor stage 110. Desulfurization reactor stage 110 can include one or more desulfurization reactors.

The desulfurization reactor stage 110 produces at least a stream 154 of lower boiling point compounds and a desulfurized heavy oil stream 115 that includes spent alkali metal reagent. The heavy oil stream 115 including the spent alkali metal reagent is passed to alkali metal reagent separator and regenerator 170 for removal of the alkali metal reagent. The lower boiling compounds in stream 154 can include distillate, naphtha, $C_4$ and smaller hydrocarbons, unreacted hydrogen, and contaminant gases such as $H_2S$ that formed during desulfurization. These various fractions can be separated out to allow for recovery of the hydrogen. The distillate and naphtha fractions can optionally undergo some processing, such as hydrotreatment. The zone for this further processing is shown as zone 120 in FIG. 1.

After the further processing, some or all of the naphtha and/or distillate compounds can be added to the heavy oil portion. The naphtha and/or distillate compounds are shown as being added via stream 123 to separator and regenerator 170. Alternatively, stream 123 could be added to stream 115 prior to entering separator and regenerator 170, or stream 123 could be added to the output stream 135 from separator and regenerator 170. Stream 135 is then passed to optional fractionator 140, which produces a final output stream 145.

Figure 2:
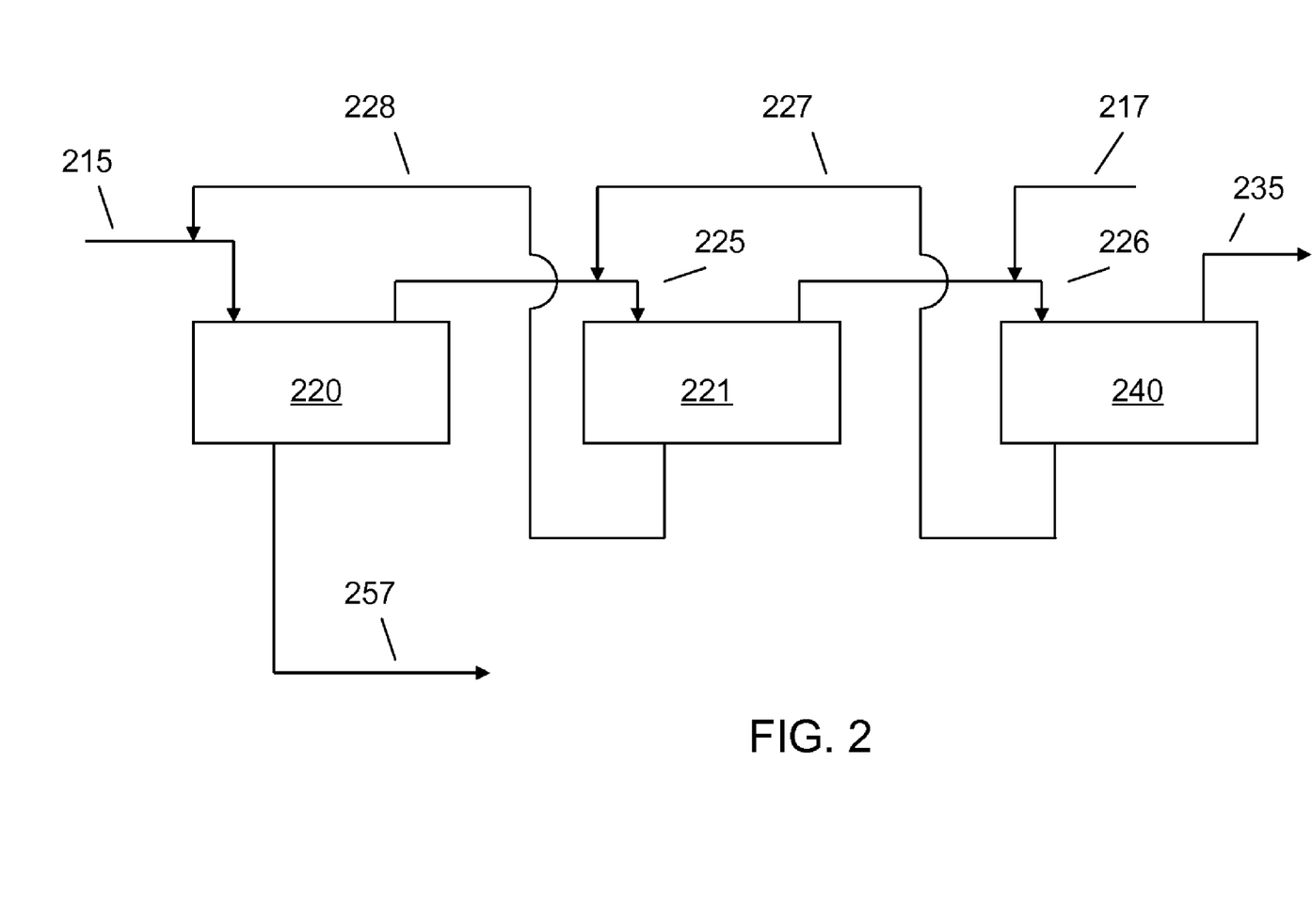
FIG. 2 schematically shows a portion of an apparatus according to an embodiment of the invention.

FIG. 2 schematically shows an example of a separator that could form a part of separator and regenerator 170 from FIG. 1. In the embodiment shown in FIG. 2, a desulfurized oil stream 215 that includes spent alkali metal particles is introduced into a settler 220. A water stream 228 is also introduced into the settler, by combining the water stream 228 with oil stream 215 prior to entry. After a suitable amount of time, the separated streams can be withdrawn. An oil based stream 225 is passed to a second settler stage 221. Additionally, a water stream 257 containing the spent alkali metal solids is withdrawn. The processing of this water stream will be discussed further in connection with FIG. 3.

Settler stage 221 has similar inputs and outputs. The inputs are oil based stream 225 and water stream 227. The outputs are the oil based stream 226 and water or aqueous phase stream 228. Note that the flow of the water in the stages is globally counter-current relative to the desulfurized oil. Thus, settler 220 is the first stage for desulfurized oil while being the last stage for the water.

In the embodiment shown in FIG. 2, the final stage is a desalting stage 240. Desalting stage 240 is similar to settler stages 220 and 221, except that desalting stage 240 also includes an electrostatic precipitator. The inputs to desalting stage 240 are oil stream 226 and water stream 217. The desulfurized oil that has been desalted 235 is withdrawn as an output stream, while a water or aqueous phase stream 227 is also withdrawn from the desalting stage 240.

Figure 3:
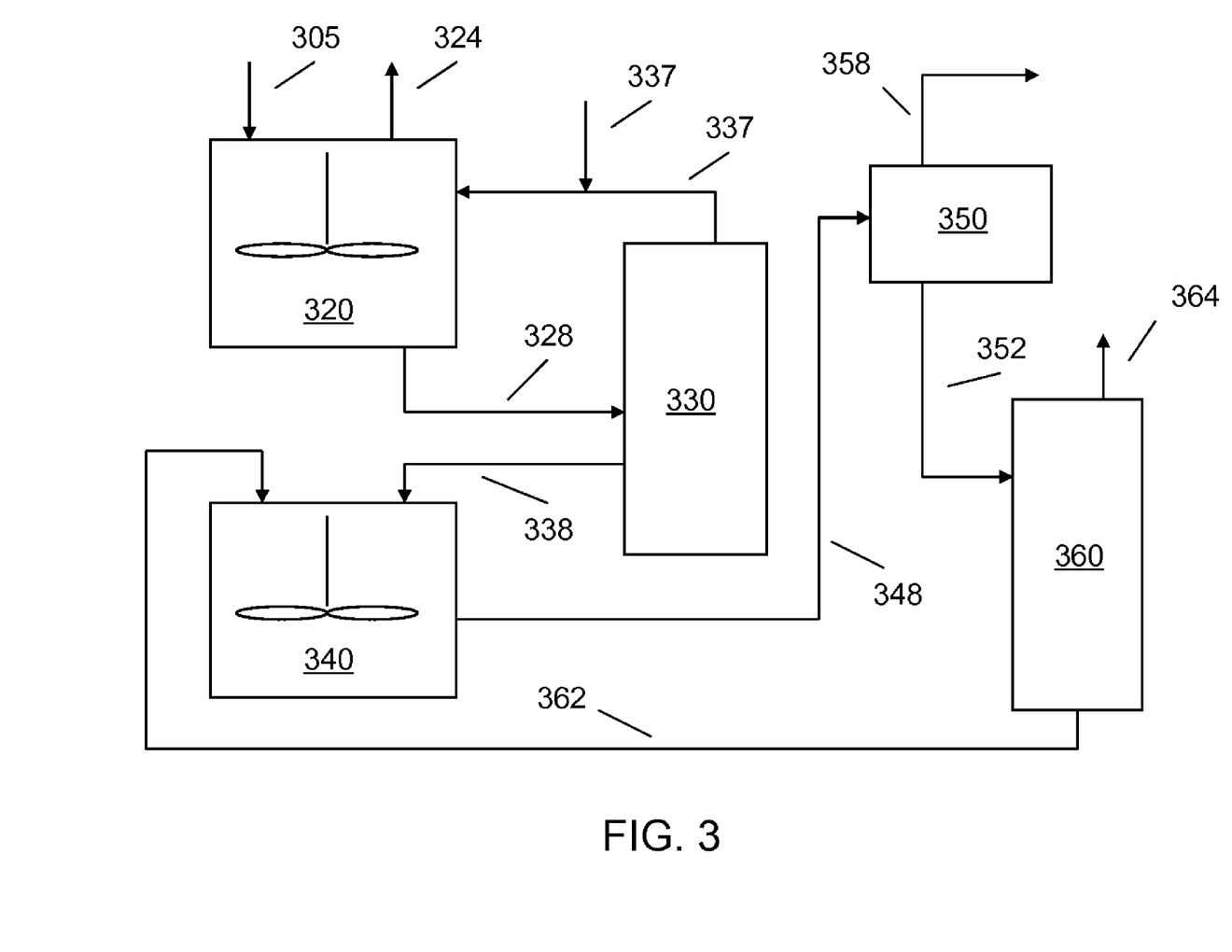
FIG. 3 schematically shows a portion of an apparatus according to an embodiment of the invention.

FIG. 3 schematically shows an example of a system for regenerating spent alkali metal reagent. An aqueous stream of spent alkali metal salt 305 is passed into a well-mixed reactor 320. A stream of $CO_2$ 337 is also introduced. $CO_2$ stream 337 is shown as including both an external portion and a recycled portion. However, in other embodiments only one of these can be used. In reactor 320, the spent alkali metal is converted into an alkali carbonate, which exits reactor 320 as stream 328. Reactor 320 also produces an $H_2S$ stream 324.

Alkali carbonate stream 328 is passed into intermediate reactor 330, where the alkali carbonate stream is heated to a sufficient temperature to convert any bicarbonate present into the carbonate. This produces fully converted carbonate stream 338, which is then contacted with CaO stream 362 in well-mixed reactor 340. The alkali carbonate is converted to alkali hydroxide, while the CaO is converted into $CaCO_3$. The reaction products leave via stream 348, which is separated in separator 350. This produces a regenerated alkali hydroxide reagent stream 358 and a stream of $CaCO_3$ solids 352. The solids 352 are passed into a kiln 360, where heating produces CaO stream 362 and a stream of $CO_2$ 364.

Additional Embodiments

In a first embodiment, a method for regenerating an alkali metal salt reagent is provided. The method includes receiving a hydrocarbon feedstream having an API gravity of at least about 20, the hydrocarbon feedstream including at least about 7.5 wt % of alkali metal salt particles, the alkali metal salt particles comprising alkali hydrogen sulfide particles. The hydrocarbon feedstream is washed with water to form a hydrocarbon product stream and an aqueous stream containing alkali metal salt. At least a portion of the aqueous alkali metal salt stream is treated with carbon dioxide under effective conditions to form aqueous alkali carbonate. The aqueous alkali carbonate is then mixed with calcium oxide under effective conditions to form alkali hydroxide and calcium carbonate solids. The calcium carbonate is separated from the aqueous alkali hydroxide. The calcium carbonate is then heated under effective conditions to form regenerated calcium oxide, wherein at least a portion of the regenerated calcium oxide is used for said mixing with aqueous alkali carbonate.

In a second embodiment, a method according to the first embodiment is provided, wherein the alkali metal salt particles further comprise at least one of alkali hydroxide or alkali sulfide particles.

In a third embodiment, a method according to any of the above embodiments is provided. The method of the third embodiment further comprises removing water from the aqueous alkali hydroxide to provide aqueous alkali hydroxide having a concentration of at least about 30 wt %. The concentrated aqueous alkali hydroxide is contacted with a hydrocarbon feedstream under effective conditions to at least partially desulfurize the hydrocarbon feedstream.

In a fourth embodiment, a method according to any of the above embodiments is provided. The method of the fourth embodiment further comprises splitting the aqueous stream comprising alkali metal salt into a first portion and a second portion, the first portion then being treated with carbon dioxide to form aqueous alkali carbonate. The second portion of aqueous alkali metal salt is combined with the aqueous alkali hydroxide. The combined aqueous alkali metal salt and aqueous alkali metal hydroxide are then dehydrated to form alkali metal sulfide.

In a fifth embodiment, a method for desulfurizing a hydrocarbon feedstream is provided. The method includes treating a hydrocarbon feedstream having an API less than about 19 and a sulfur content of at least about 0.5 wt % with an effective amount of a potassium salt reagent under effective conditions to form an at least partially desulfurized hydrocarbon feedstream and potassium hydrogen sulfide particles. The at least partially desulfurized hydrocarbon feedstream is washed to form an at least partially desulfurized hydrocarbon product and an aqueous potassium hydrogen sulfide stream. The aqueous potassium hydrogen sulfide stream is treated with carbon dioxide to form aqueous potassium carbonate. The aqueous potassium carbonate is mixed with calcium oxide under effective conditions to form aqueous potassium hydroxide and calcium carbonate particles. The aqueous potassium hydroxide is separated from the calcium carbonate particles. Water is then removed from the aqueous potassium hydroxide to provide aqueous potassium hydroxide having a concentration of at least about 40% by weight of potassium hydroxide. The calcium carbonate is heated under effective conditions to form regenerated calcium oxide, wherein at least a portion of the regenerated calcium oxide is used for said mixing with aqueous potassium carbonate.

In a sixth embodiment, a method according to the fifth embodiment is provided, wherein the effective desulfurization conditions include a pressure from about 50 to about 3000 psi (345 to 20,684 kPa) and preferably at least about 200 psi (1,379 kPa), a hydrogen partial pressure about 100 to about 2500 psi (689 to 17,237 kPa), a temperature from about 600° F. to about 900° F. (316° C. to 482° C.), and a potassium salt reagent concentration of at least about 0.75 wt % relative to the weight of the hydrocarbon feed.

In a seventh embodiment, a method according to the fifth or sixth embodiments is provided, wherein the potassium salt reagent comprises potassium hydroxide, potassium sulfide, sodium potassium sulfide, or a combination thereof.

In an eighth embodiment, a method according to any of the fifth through seventh embodiments is provided. The eighth embodiment further comprises mixing the concentrated potassium hydroxide with the hydrocarbon feedstream. The mixed hydrocarbon feedstream is then dehydrated to form potassium hydroxide particles, potassium sulfide particles, or a combination thereof.

In a ninth embodiment, a method according to any of the above embodiments is provided, wherein effective conditions for treating an aqueous stream with carbon dioxide comprise a temperature of at least about 135° C. and a pressure of at least about 200 psig (1379 kPa).

In a tenth embodiment, a method according to any of the above embodiments is provided, wherein separating alkali metal salt particles or potassium hydrogen sulfide particles from the hydrocarbon feedstream comprises desalting the hydrocarbon feedstream using an electrostatic precipitator.

In an eleventh embodiment, a method according to any of the above embodiments is provided, wherein heating the calcium carbonate under effective conditions comprises heating the calcium carbonate to at least about 900° C.

In a twelfth embodiment, a method according to any of the above embodiments is provided. The twelfth embodiment further comprises seeding the aqueous alkali carbonate or potassium carbonate with calcium carbonate particles prior to or during said mixing regenerated calcium oxide.

In a thirteenth embodiment, a method according to any of the above embodiments is provided, wherein the aqueous carbonate stream includes aqueous bicarbonate, the method further comprising heating the aqueous carbonate stream to convert aqueous bicarbonates to aqueous carbonates prior to the mixing with regenerated calcium oxide.

In a fourteenth embodiment, a method according to any of the above embodiments is provided. The fourteenth embodiment further comprises washing the calcium carbonate after said separation and prior to said heating of the calcium carbonate.

In a fifteenth embodiment, a method according to any of the above embodiments is provided, wherein heating the calcium carbonate further comprises forming carbon dioxide. The fifteenth embodiment also further comprises collecting the carbon dioxide formed by heating of the calcium carbonate, wherein at least a portion of the collected carbon dioxide is used for said treating of the aqueous alkali metal salt stream or the aqueous potassium hydrogen sulfide stream.

Although the present invention has been described in terms of specific embodiments, it is not so limited. Suitable alterations and modifications for operation under specific conditions will be apparent to those skilled in the art. It is therefore intended that the following claims be interpreted as covering all such alterations and modifications as fall within the true spirit and scope of the invention.

What is claimed is:

1. A method for regenerating an alkali metal salt reagent, comprising:
   a) receiving a hydrocarbon feedstream having an API gravity of at least about 20, the hydrocarbon feedstream including at least about 7.5 wt % of alkali metal salt particles, the alkali metal salt particles comprising alkali metal hydrogen sulfide particles;
   b) washing the hydrocarbon feedstream with water to form a hydrocarbon product stream and an aqueous alkali metal salt stream containing alkali metal salt;
   c) treating at least a portion of the aqueous alkali metal salt stream with carbon dioxide under effective conditions to form an aqueous alkali carbonate stream;
   d) mixing the aqueous alkali carbonate stream with regenerated calcium oxide under effective conditions to form an aqueous alkali metal hydroxide and calcium carbonate solids;
   e) separating the calcium carbonate from the aqueous alkali metal hydroxide; and
   f) heating the calcium carbonate under effective conditions to form regenerated calcium oxide, wherein at least a portion of the regenerated calcium oxide is used for said mixing with aqueous alkali carbonate.

2. The method of claim 1, wherein the alkali metal salt particles further comprise at least one of alkali metal hydroxide or alkali metal sulfide particles.

3. The method of claim 1, further comprising:
removing water from the aqueous alkali metal hydroxide to provide a concentrated aqueous alkali metal hydroxide stream having a concentration of at least about 30 wt %; and
contacting the concentrated aqueous alkali metal hydroxide stream with a hydrocarbon feedstream under effective conditions to at least partially desulfurize the hydrocarbon feedstream.

4. The method of claim 1, wherein the aqueous alkali carbonate stream includes aqueous bicarbonate, the method further comprising heating the aqueous alkali carbonate stream to convert aqueous bicarbonates to aqueous carbonates prior to the mixing with the regenerated calcium oxide.

5. The method of claim 1, wherein the alkali metal hydroxide is comprised of potassium hydroxide, sodium hydroxide, or a combination thereof.

6. The method of claim 5, wherein effective conditions for treating the aqueous alkali carbonate stream with regenerated calcium oxide comprise a temperature of at least about 135° C. (275° F.) and a pressure of at least about 200psig (1379 kPa).

7. The method of claim 5, wherein washing the hydrocarbon feedstream and separating potassium hydrogen sulfide particles from the hydrocarbon feedstream in step b) comprises desalting the hydrocarbon feedstream using an electrostatic precipitator.

8. The method of claim 5, wherein heating the calcium carbonate under effective conditions comprises heating the calcium carbonate to at least about 900° C. (1652° F.).

9. The method of claim 5, further comprising seeding the aqueous alkali carbonate stream with calcium carbonate particles prior to or during said mixing with regenerated calcium oxide.

10. The method of claim 5, wherein heating the calcium carbonate further comprises forming carbon dioxide, the method further comprising:
collecting the carbon dioxide formed by heating of the calcium carbonate, wherein at least a portion of the collected carbon dioxide is used for said treating of the aqueous alkali metal salt stream.

11. The method of claim 5, wherein washing the hydrocarbon feedstream with water to form a hydrocarbon product stream and an aqueous alkali metal salt stream containing alkali metal salt is performed under conditions of at least 120° C. (248° F.) and 100 psig (690 kPa).

12. The method of claim 5, wherein mixing the aqueous alkali carbonate stream with regenerated calcium oxide under effective conditions to form alkali hydroxide and calcium carbonate solids is performed under conditions of at least 120° C. (248° F.) and 200 psig (1379 kPa).

13. The method of claim 1, further comprising:
mixing at least a portion of the aqueous alkali metal hydroxide with a hydrocarbon feedstream having an API less than about 19 and a sulfur content of at least about 0.5 wt % under effective desulfurization conditions to form an at least partially desulfurized hydrocarbon feedstream and alkali metal hydrogen sulfide particles.

14. The method of claim 13, wherein the effective desulfurization conditions include a pressure from about 50 to about 3000 psi (345 to 20,684 kPa), a temperature from about 600° F. to about 900° F. (316° C. to 482° C.), and a aqueous alkali metal hydroxide concentration of at least about 7.5 wt % relative to the weight of the hydrocarbon feed.

15. The method of claim 14, wherein the effective desulfurization conditions further comprise a hydrogen partial pressure about 100 to about 2500psi (689 to 17,237 kPa).

16. The method of claim 14, further comprising:
heating the mixed hydrocarbon feedstream and aqueous alkali metal hydroxide to form alkali metal hydroxide particles, alkali metal sulfide particles, or a combination thereof to a temperature of at least 150° C. (302° F.) and removing at least a portion of the water therein prior to subjecting the mixed hydrocarbon feedstream and aqueous alkali metal hydroxide stream to effective desulfurization conditions.

17. The method of claim 16, wherein the alkali metal hydroxide is comprised of potassium hydroxide, sodium hydroxide, or a combination thereof.

18. A method for regenerating an alkali metal salt reagent, comprising:
a) receiving a hydrocarbon feedstream having an API gravity of at least about 20, the hydrocarbon feedstream including at least about 7.5 wt % of alkali metal salt particles, the alkali metal salt particles comprising alkali hydrogen sulfide particles;
b) washing the hydrocarbon feedstream with water to form a hydrocarbon product stream and an aqueous stream containing alkali metal salt;
c) splitting the aqueous stream comprising alkali metal salt into a first portion and a second portion;
d) treating the first portion of the aqueous alkali metal salt stream with carbon dioxide under effective conditions to form aqueous alkali carbonate;
e) mixing the aqueous alkali carbonate with calcium oxide under effective conditions to form alkali hydroxide and calcium carbonate solids;
f) separating the calcium carbonate from the aqueous alkali hydroxide;
g) combining the second portion of aqueous alkali metal salt with the aqueous alkali hydroxide;
h) dehydrating the combined aqueous alkali metal salt and aqueous alkali metal hydroxide to form alkali metal sulfide; and
i) heating the calcium carbonate under effective conditions to form regenerated calcium oxide, wherein at least a portion of the regenerated calcium oxide is used for said mixing with aqueous alkali carbonate.

19. The method of claim 18, wherein dehydrating the combined aqueous alkali metal salt and aqueous alkali hydroxide comprises heating the combined aqueous alkali metal salt and aqueous alkali hydroxide to at least about 350° C. (662° F.).

20. The method of claim 19, wherein the alkali metal salt is comprised of potassium hydroxide, sodium hydroxide, or a combination thereof.

* * * * *